March 21, 1961 E. N. ARMANINI 2,976,427

TRANSISTOR MULTIVIBRATOR

Filed Sept. 27, 1956 2 Sheets-Sheet 1

INVENTOR.
EDWARD N. ARMANINI
BY Lewis L. Humphries
ATTORNEY

March 21, 1961 E. N. ARMANINI 2,976,427

TRANSISTOR MULTIVIBRATOR

Filed Sept. 27, 1956 2 Sheets-Sheet 2

INVENTOR.
EDWARD N. ARMANINI
BY Lewis L. Humphries
ATTORNEY

United States Patent Office 2,976,427
Patented Mar. 21, 1961

2,976,427

TRANSISTOR MULTIVIBRATOR

Edward N. Armanini, Bellflower, Calif., assignor to North American Aviation, Inc.

Filed Sept. 27, 1956, Ser. No. 612,440
10 Claims. (Cl. 307—88.5)

Figure 1:
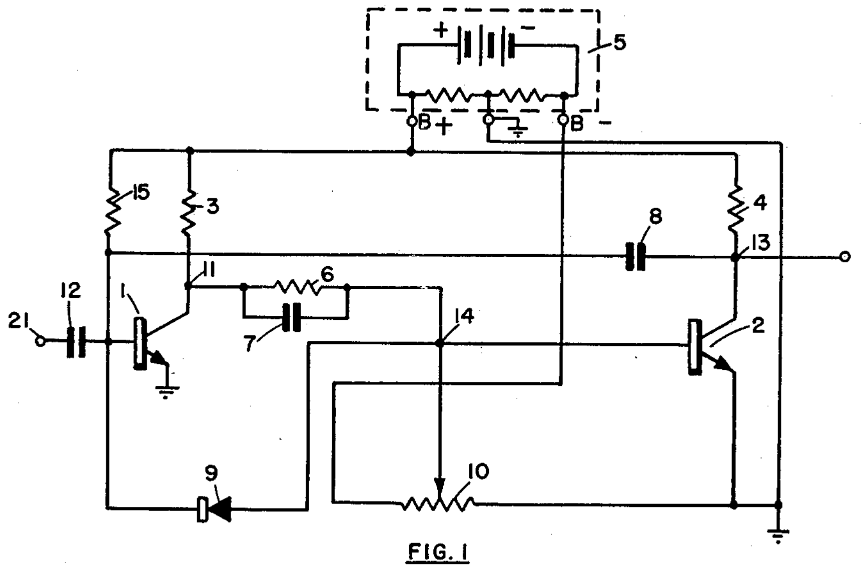

This invention relates to wave form generators and more particularly to a continuously variable linear time base and gate generator.

In the field of radar there is a continuing need for accurate and simple wave form generators. In particular, there is a need for a time modulation circuit which is designed to indicate a time interval proportional to a control variable. Such a circuit is a saw tooth wave generator which is used as a timing wave form circuit in a radar system. The saw tooth wave generator accepts a negative or positive trigger pulse and generates a negative or positive-going triangular wave form. It is desirable to generate a triangle with a maximum duty cycle and a minimum of linear error. The duty cycle is the ratio of the triangular pulse width to the pulse repetition time it takes to return the amplitude of triangular wave to its quiescent levels after the end of the triangular wave form. Known wave form generators depend for accuracy on the characteristics of electron tubes and other circuit elements which vary considerably in relation to temperature, time of operation, and other inherent variables. To compensate for these inherent errors, complicated circuits are designed which often fail to completely compensate for them.

The use of a multivibrator to generate wave forms is well-known. A common multivibrator circuit such as the monostable or "one shot" multivibrator ordinarily includes a pair of amplifying devices such as transistors or tubes which have certain of their electrodes cross-coupled to form a two-stage regeneratively coupled multivibrator with one amplifying device originally conducting and the other amplifying device cut off. The application of a trigger pulse to the conducting device causes the conducting device to cut off and the nonconducting device to commence conduction. After a time determined by the time constant, characteristics of the circuit, conduction of the second device is cut off, and the first device commences conduction again and continues conduction until a subsequent triggering pulse is applied.

This invention contemplates causing the normally conducting transistor of a monostable multivibrator to cut off by coupling circuits between the transistors of the multivibrator which cause the circuit to produce a pulse inversion after a definite time and also to provide a triangular wave output at one of the transistors and a square wave output at the other transistor. A triangular wave output is obtained by the use of a negative feedback circuit between the output and input of one of the transistors.

The invention herein described is one of simplicity and accuracy. The production of a continuously variable linear triangular wave form with a large duty cycle is a decided advantage.

It is therefore an object of this invention to provide an improved triangular wave form generator.

It is another object of this invention to provide an improved multivibrator.

It is another object of this invention to provide a transistor multivibrator with improved control characteristics.

It is still another object of this invention to provide a circuit for generating a square wave and a triangular wave.

It is a further object of this invention to provide a triangular wave form generator with improved linearity.

It is a still further object of this invention to provide a triangular wave form generator with a large duty cycle.

Figure 2:
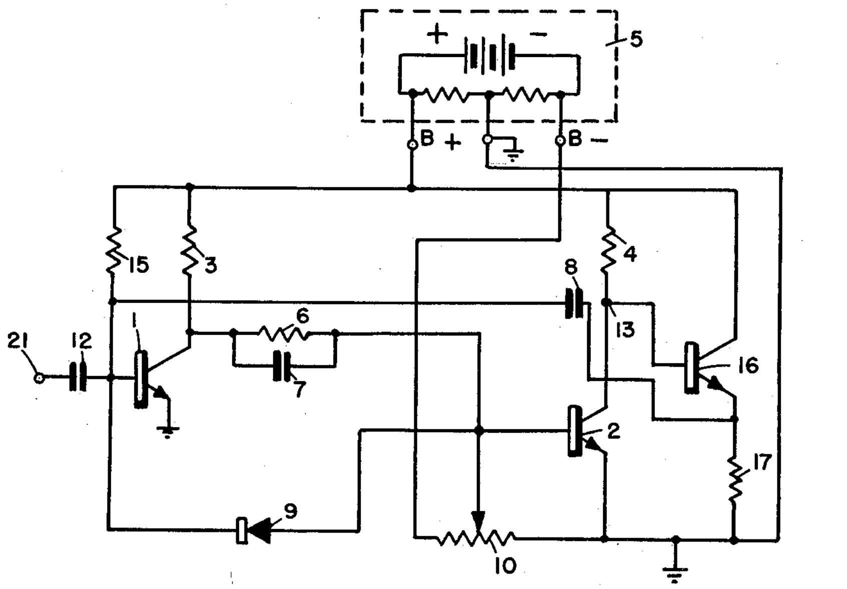
Figure 3:
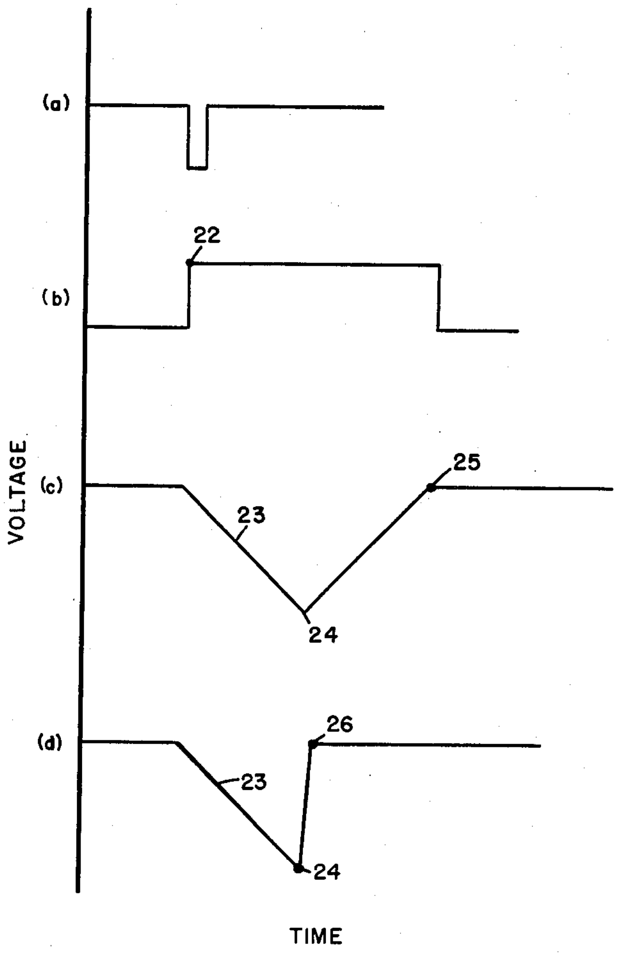

Other objects of invention will become apparent from the following description taken in connection with the accompanying drawings, in which Fig. 1 is a schematic diagram of one embodiment of this invention;

Fig. 2 is a schematic diagram of another embodiment of this invention which shows circuitry to increase the duty cycle of the triangular wave form output;

And Fig. 3 is a graphical illustration of the output wave forms of the device of this invention.

Referring to Fig. 1, transistors 1 and 2 comprise a multivibrator with transistor 1 being normally conductive and transistor 2 being normally cut off. Resistors 3 and 4 connect the transistor collectors respectively to the B+ terminal of power supply 5. The emitters of transistors 1 and 2 are connected to the ground terminal. The collector of transistor 1 is connected through resistor 6 and capacitor 7 in parallel to the base of transistor 2. The collector of transistor 2 is connected through capacitor 8 to the base of transistor 1. The base of transistor 1 is also connected through diode 9 to the base of transistor 2 providing a circuit from the collector to the base of transistor 2 through capacitor 8 and diode 9. Diode 9 is poled in a direction to allow current to flow from the collector of transistor 2 to the bases of transistors 1 and 2 but not to allow current to flow in the reverse direction. The base of transistor 2 is connected through variable resistor 10 to the B− terminal of power supply 5 which is at a lower potential than the ground terminal. Variable resistor 10 may be adjusted to vary the normal bias voltage existing upon the base of transistor 2. The base of transistor 1 is connected to receive an input pulse from terminal 21 through capacitor 12. The base of transistor 1 is returned through resistor 15 to the B+ terminal of power supply 5 to establish a normal positive bias voltage.

The wave form generator circuit comprises transistors 1 and 2 operating to sustain one stable state wherein transistor 1 is conducting and transistor 2 is nonconducting. The active or unstable state of the circuit exists when transistor 1 is cut off and transistor 2 is conducting. The stable state in which transistor 1 is conducting will remain until a negative pulse signal is received from an external source and is impressed upon the base of transistor 1 whereupon the conducting conditions of transistors 1 and 2 are reversed putting the circuit in its unstable state where is will remain for a time determined by the circuit constants of the coupling circuits including capacitor 8 and resistors 4 and 15 connected between the collector of transistor 2 and the base of transistor 1. After the aforesaid time interval the circuit will restore itself to its stable state.

In operation, assuming the circuit is in its normal or stable state, transistor 1 is conducting since the base is held positive with respect to the emitter by the connection through resistor 15 to the B+ terminal and transistor 2 is cut off by the bias voltage at point 14 across resistor 10. A negative pulse of sufficient magnitude is applied through terminal 21 and capacitor 12 to the base of transistor 1 to cut off transistor 1. The potential at point 11 of the collector of transistor 1 raises almost immediately to approximately the B+ level. This positive going potential is coupled to the base of transistor 2 through capacitor 7 and resistor 6 causing point 14 in the base circuit of transistor 2 to go positive. Since the base of transistor 2 is positive with respect to its emitter because of the positive going potential at point 14, transistor 2 will commence to conduct.

The potential at point 13 of the collector of transistor 2 which was at B+ prior to conduction of transistor 2 commences to go negative because of the current flow from the collector to emitter of transistor 2. Capacitor 8 couples the negative going potential of point 13 to the base of transistor 1 to further cut off transistor 1 and also couples the negative going potential through diode 9 to point 14 of the base of transistor 2.

Stopping for a moment at this point in the operation of the circuit it becomes clear that two conditions are affecting the potential of point 14 and therefore the potential of point 13 in the collector circuit of transistor 2. The positive going voltage at point 11 coupled through resistor 6 and capacitor 7 causes the potential at point 14 to become positive thereby causing transistor 2 to conduct and point 13 to go negative. However, a negative going potential is placed on point 14 as soon as transistor 2 commences to conduct by the action of capacitor 8 and diode 9 which couple the negative going potential at point 13 to point 14. Thus the negative going voltage from point 13 fed to point 14 is opposing the positive voltage from point 11 fed to point 14. This results in a modified effect at point 14 which produces a triangular wave form at point 13. This particular way of feeding back from the collector to the base of a negative going potential just after a positive going potential is presented to the base is the essential design that provides the linear time base generator output at point 13 of the collector of transistor 2. In effect, therefore, the negative going voltage fed from point 13 to point 14 reduces the effect of the constant positive voltage fed from point 11 to point 14, resulting in an integration at point 14 of the constant positive voltage fed from point 11.

During this active state wherein transistor 2 is conducting and transistor 1 is cut off, the potential at point 11 will remain at B+ and thereby provide a positive pulse output at point 11 while the potential at point 13 is linearly falling from B+.

When capacitor 8 has discharged sufficiently to allow the base of transistor 1 to return positively through resistor 15 to the cut off potential, transistor 1 commences conduction lowering the potential at point 11 of the collector circuit. The negative going potential at point 11 is coupled through capacitor 7 and resistor 6 to point 14. Transistor 2 ceases conduction because of the negative going potential on its base and point 13 rises rapidly to the B+ voltage. Transistors 1 and 2 having completed a cycle of their monostable multivibrator action are now in their normal or quiescent condition again. The length of time that transistor 1 is cut off and transistor 2 is conducting during the unstable state can be varied by varying the impedance of resistor 10 which will vary the potential at 14 thus determining the time transistor 2 conducts.

Turning now to Fig. 2, the multivibrator circuit of Fig. 1 is included along with transistor 16 which is connected between capacitor 8 and the collector of transistor 2 to operate as an emitter follower circuit. In the circuit of Fig. 1 when the potential at point 13 starts to rise from its most negative potential due to the cutting off of transistor 2 by transistor 1, the time that it takes point 13 to return to the B+ or quiescent potential is directly proportional to the time it takes capacitor 8 to charge through resistor 4 to the B+ potential. In Fig. 2 transistor 16 has its collector-emitter connected in series between capacitor 8 and the B+ supply. The emitter of transistor 16 is connected through resistor 17 to ground and the base is connected to the collector of transistor 2. In operation, when transistor 2 commences to cut off, the potential at the collector or point 13 rises causing transistor 16 to immediately conduct into saturation, providing a current path from the B+ terminal through low resistance 17, the collector-emitter of transistor 15 and to capacitor 8. The low resistance of resistor 17 allows capacitor 8 to charge rapidly thus bringing point 13 to the B+ potential in a short time interval. Transistor 16 is cut off during the time transistor 2 is conducting. Utilizing the emitter follower of transistor 16 increases the duty cycle of the circuit of Fig. 1 from approximately fifty percent to over ninety percent thus allowing more efficient utilization of the triangular wave form output from point 13 in radar circuits.

In Fig. 3 which shows the output wave forms of the invention, Fig. 3*a* shows the negative trigger pulse applied to the base of transistor 1. Fig. 3*b* is the voltage wave form at point 11 of the collector of transistor 1. Fig. 3*c* is the triangular wave form produced at point 13 at the collector of transistor 2 in the circuit of Fig. 1, and Fig. 3*d* is the triangular wave form produced at point 13 in the circuit of Fig. 2. When the negative pulse at Fig. 3*a* is applied to transistor 1 point 11 rises immediately to a potential indicated by point 22 of Fig. 3*b*. Point 13 which was at the quiescent potential begins to fall along line 23 as indicated in Fig. 3*c*. The integrating effect of the negative feedback circuit from the collector to base of transistor 2 combines with the positive potential coupling of point 11 to point 14 to cause line 23 to have a linear run down. When capacitor 8 discharges to a point allowing the voltage at the base of transistor 1 to go positive enough to cause conduction, the voltage at point 12 of Fig. 1 which is at point 24 level in Fig. 3*c*, again rises to the quiescent level indicated at point 25 of Fig. 3*c*. The voltage at point 11 of the collector of transistor 1 returns to its quiescent level as indicated in Fig. 3*b*. The time that it takes voltage at point 13 of Fig. 1 to go from point 24 to point 25 of Fig. 3*c* determines the duty cycle. In Fig. 3*c* which is the wave form of the circuit shown in Fig. 1, it is apparent that the duty cycle is approximately fifty percent. In other words, it takes about the same time for the voltage at point 13 of Fig. 1 to go from quiescent to negative as it takes to go from negative back to quiescent completing the triangle. In Fig. 3*d* the triangular wave form of point 13 in the circuit of Fig. 2 is shown. Line 23 again represents the fall in voltage at point 13 and line 24 is the point where transistor 2 starts to cut off. Due to the effect of the emitter follower transistor 16 which allows capacitor 8 to charge in a shorter time than the circuit in Fig. 1, the time it takes to go from point 24 to point 26 is considerably shorter than the time it takes to go from point 24 to point 25 which is shown in Fig. 3*c*. The duty cycle of the wave form in Fig. 3*d* is approximately ninety percent.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a first transistor, a second transistor, means for establishing operating potentials on said transistors, coupling means connected between the output of said first transistor and the input of said second transistor to cause said second transistor to conduct as said first transistor becomes nonconductive, positive feedback means connected between the output of said second transistor and the input of said first transistor to tend to cause said first transistor to be nonconductive when said second transistor is conducting, and integrating means connected between the output and input of said second transistor to decrease the output of said second transistor.

2. Claim 1 as described wherein said integrating means comprises a capacitor and a unidirectional conductive device connected between the collector and base of said second transistor.

3. Claim 1 as described wherein said positive feedback means comprise a resistor-capacitor circuit.

4. In combination, a first transistor having at least a collector, a base, and an emitter, a second transistor having at least a collector, base, and an emitter, a resistor-capacitor circuit connecting the output of said first transistor with the base of said second transistor, a capacitor, said second transistor having its output connected to the base of said first transistor by said capacitor, and negative feedback means including said capacitor for coupling the output of said second transistor to the base of said second transistor.

5. In combination, a first transistor having at least a collector, a base, and an emitter, a second transistor having at least a collector, a base, and an emitter, a resistor-capacitor circuit connecting the collector of said first transistor with the base of said second transistor, a capacitor, said second transistor having its collector connected to the base of said first transistor by said capacitor, negative feedback means for coupling the collector and the base of said second transistor, said negative feedback means comprising a unidirectional conductive device connected in series with said capacitor between the collector and base of said second transistor, and means for conducting a pulse to the base of said first transistor to commence conduction thereof whereby a square output is produced at the collector of said first transistor and a triangular wave output is produced at the collector of said second transistor.

6. A variable wave form generator comprising a normally conductive transistor and a normally nonconductive transistor each said transistor having at least a collector, a base and an emitter, a resistor and capacitor connected in parallel joining the collector of said normally conductive transistor to the base of said normally nonconductive transistor, a capacitor joining the base of said normally conductive transistor to the collector of said normally nonconductive transistor, a diode connected in series with said capacitor to join the collector and base of said normally nonconductive transistor for negative feedback operation, means for conducting a pulse to the base of said normally conductive transistor to prevent conduction thereof and commence conduction of said normally nonconductive transistor, whereby the output of said normally conductive transistor is a substantially square wave, and the output of said normally nonconductive transistor is a substantially square wave, and the output of said normally nonconductive transistor is a substantially triangular wave.

7. Claim 6 as described wherein is included a resistor connecting the bases of said transistors to ground, the value of said resistor determining the width of said square wave.

8. A variable wave form generator comprising a normally conductive transistor and a normally nonconductive transistor, each said transistor having at least a collector, a base, and an emitter, a respective circuit connecting the collectors of said transistors to one side of a power source, a base return circuit comprising a resistor connecting the bases of said transistors to the other side of said power source, a resistor and capacitor connected in parallel joining the collector of said normally conductive transistor to the base of said normally nonconductive transistor, a capacitor joining the base of said normally conductive transistor to the collector of said normally nonconductive transistor, a diode connected in series with said capacitor to join the collector and base of said normally nonconductive transistor for negative feedback operation, means for conducting a pulse to the base of said normally conductive transistor to prevent conduction thereof and to commence conduction of said normally nonconductive transistor, whereby the output of said normally conductive transistor is a substantially square wave, and the output of said normally nonconductive transistor is a substantially triangular wave.

9. Claim 8 as described wherein said diode is poled in a direction to prevent current flow from the base of said normally conductive transistor to the base of said normally nonconductive transistor.

10. Claim 8 as described wherein is included a third transistor having at least a collector, a base, and an emitter, the emitter-base circuit of said third transistor connected in series between said capacitor and the collector of said normally nonconducting transistor, the collector of said third transistor connected through a low impedance means to one side of said power source to provide a low impedance circuit between said power source and said capacitor when said normally nonconductive transistor is nonconducting.

References Cited in the file of this patent

UNITED STATES PATENTS

| | | |
|---|---|---|
| 2,622,212 | Anderson et al. | Dec. 16, 1952 |
| 2,651,717 | Uttley et al. | Sept. 8, 1953 |
| 2,673,936 | Harris | Mar. 30, 1954 |
| 2,703,368 | Wrathall | Mar. 1, 1955 |
| 2,730,575 | Hayden-Pigg | Jan. 10, 1956 |
| 2,760,007 | Lozier | Aug. 21, 1956 |
| 2,776,382 | Jensen | Jan. 1, 1957 |
| 2,778,978 | Drew | Jan. 22, 1957 |
| 2,791,739 | Light | May 7, 1957 |
| 2,850,630 | Prugh | Sept. 2, 1958 |

FOREIGN PATENTS

| | | |
|---|---|---|
| 1,122,425 | France | May 22, 1956 |

UNITED STATES PATENT OFFICE

CERTIFICATE OF CORRECTION

Patent No. 2,976,427 March 21, 1961

Edward N. Armanini

It is hereby certified that error appears in the above numbered patent requiring correction and that the said Letters Patent should read as corrected below.

Column 2, line 53, for "is" read -- it --; column 5, line 47, for "square wave," read -- triangular wave. --; lines 47, 48 and 49, strike out "and the output of said normally non-conductive transistor is a substantially triangular wave.".

Signed and sealed this 12th day of December 1961.

(SEAL)
Attest:

ERNEST W. SWIDER
Attesting Officer

DAVID L. LADD
Commissioner of Patents

USCOMM-DC